United States Patent
Ishida et al.

(10) Patent No.: US 7,752,349 B2
(45) Date of Patent: Jul. 6, 2010

(54) APPARATUS AND METHOD FOR PERFORMING DMA DATA TRANSFER

(75) Inventors: Kensuke Ishida, Kawasaki (JP); Masaaki Nagatsuka, Kawasaki (JP); Hiroyuki Oka, Kawasaki (JP); Takuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 11/441,118

(22) Filed: May 26, 2006

(65) Prior Publication Data
US 2007/0204074 A1    Aug. 30, 2007

(30) Foreign Application Priority Data
Feb. 28, 2006    (JP)    ............... 2006-51872

(51) Int. Cl.
G06F 12/04    (2006.01)
(52) U.S. Cl. ............... 710/22; 710/29; 710/33; 710/34; 710/35
(58) Field of Classification Search ........... 710/22, 710/23, 28, 31, 52, 10, 100, 105, 111, 24, 710/241, 26, 27, 33, 35; 711/1, 114, 161, 711/165; 370/216, 465, 229, 235, 389, 395, 370/412; 709/200, 237, 250
See application file for complete search history.

(56) References Cited

U.S. PATENT DOCUMENTS

| | | | | |
|---|---|---|---|---|
| 4,271,466 A | * | 6/1981 | Yamamoto et al. ............ | 710/30 |
| 4,313,160 A | * | 1/1982 | Kaufman et al. ............... | 710/23 |
| 5,045,993 A | * | 9/1991 | Murakami et al. ........... | 712/236 |
| 5,068,785 A | * | 11/1991 | Sugiyama ................... | 710/105 |
| 5,140,679 A | * | 8/1992 | Michael ....................... | 710/106 |
| 5,179,661 A | * | 1/1993 | Copeland et al. .............. | 710/29 |
| 5,379,381 A | * | 1/1995 | Lamb ............................ | 710/6 |
| 5,444,855 A | * | 8/1995 | Thompson ................... | 710/107 |
| 5,539,916 A | * | 7/1996 | Yamasaki et al. ............. | 710/22 |
| 5,608,889 A | * | 3/1997 | Werlinger et al. ........... | 711/217 |
| 5,628,026 A | * | 5/1997 | Baron et al. ................... | 710/1 |

(Continued)

FOREIGN PATENT DOCUMENTS

EP    1 564 643 A2    8/2005

(Continued)

OTHER PUBLICATIONS

Extended European Search Report, mailed Dec. 22, 2006, and issued in corresponding European Patent Application No. 06114790.6-1229.

Primary Examiner—Henry W. H. Tsai
Assistant Examiner—Cheng-Yuan Tseng
(74) Attorney, Agent, or Firm—Staas & Halsey LLP

(57) ABSTRACT

The DMA data transfer apparatus includes a memory, a communication controller, a DMA controller having a plurality of DMA engines each of which transfers data by DMA to the communication controller from the memory, and a DMA control unit. The DMA control unit determines a division size of transfer data such that the DMA engine can transfer the data, issues a data transfer directive by the DMA to the DMA controller, and controls data transfer by the DMA. The DMA control unit transmits the determination information for determination of the termination of data transfer to the communication controller. The communication controller determines the termination of data transfer based on the determination information transmitted from the DMA control unit.

12 Claims, 11 Drawing Sheets

U.S. PATENT DOCUMENTS

| | | | |
|---|---|---|---|
| 5,644,787 A * | 7/1997 | Nakamura et al. | 710/33 |
| 5,687,389 A * | 11/1997 | Packer | 710/5 |
| 5,768,622 A * | 6/1998 | Lory et al. | 710/35 |
| 5,805,927 A * | 9/1998 | Bowes et al. | 710/23 |
| 5,822,618 A * | 10/1998 | Ecclesine | 710/57 |
| 5,928,339 A * | 7/1999 | Nishikawa | 710/26 |
| 5,991,817 A * | 11/1999 | Rowett et al. | 709/250 |
| 6,026,443 A | 2/2000 | Oskouy et al. | |
| 6,084,880 A * | 7/2000 | Bailey et al. | 370/395.2 |
| 6,125,425 A * | 9/2000 | Cole et al. | 711/106 |
| 6,148,326 A * | 11/2000 | Born et al. | 718/108 |
| 6,260,082 B1 | 7/2001 | Barry et al. | |
| 6,330,623 B1 * | 12/2001 | Wu et al. | 710/23 |
| 6,496,740 B1 * | 12/2002 | Robertson et al. | 700/20 |
| 6,629,161 B2 * | 9/2003 | Matsuki et al. | 710/22 |
| 6,702,056 B2 * | 3/2004 | Tanaka et al. | 180/269 |
| 6,775,716 B2 * | 8/2004 | Tojima et al. | 710/22 |
| 6,898,723 B2 * | 5/2005 | Tsai | 713/500 |
| 7,010,614 B2 * | 3/2006 | Satran et al. | 709/237 |
| 7,035,956 B2 * | 4/2006 | Tanaka | 710/306 |
| 7,133,943 B2 * | 11/2006 | Carnevale et al. | 710/52 |
| 7,177,966 B2 * | 2/2007 | Shingaki | 710/241 |
| 7,310,717 B2 * | 12/2007 | Nishino et al. | 711/165 |
| 7,323,438 B2 * | 1/2008 | Hedges et al. | 510/438 |
| 7,401,257 B2 * | 7/2008 | Usui | 714/27 |
| 7,415,549 B2 * | 8/2008 | Vemula et al. | 710/22 |
| 7,475,271 B2 * | 1/2009 | Oner | 713/502 |
| 7,577,772 B2 * | 8/2009 | Sonksen et al. | 710/22 |
| 2002/0029305 A1 | 3/2002 | Satran et al. | |
| 2003/0172224 A1 * | 9/2003 | Gulick et al. | 711/1 |
| 2003/0200362 A1 | 10/2003 | Hayashi et al. | |
| 2004/0151176 A1 * | 8/2004 | Burton et al. | 370/389 |
| 2005/0027900 A1 | 2/2005 | Pettey | |
| 2005/0138236 A1 * | 6/2005 | Hwang et al. | 710/24 |
| 2007/0083680 A1 * | 4/2007 | King et al. | 710/22 |
| 2008/0313363 A1 * | 12/2008 | Granit et al. | 710/24 |

FOREIGN PATENT DOCUMENTS

| | | |
|---|---|---|
| JP | 04-236649 | 8/1992 |
| JP | 2000-267988 | 9/2000 |
| JP | 2003-316722 | 11/2003 |

* cited by examiner

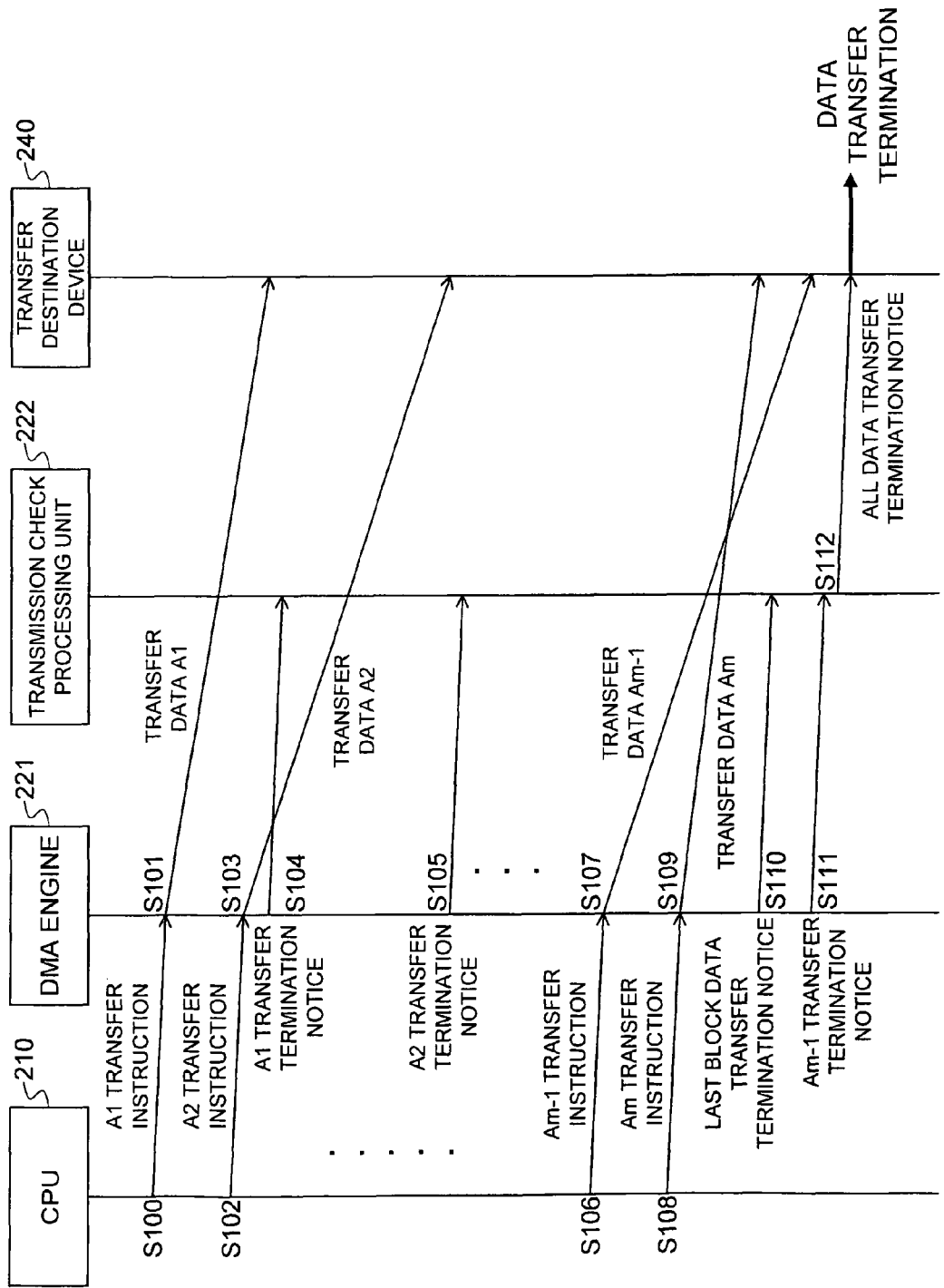

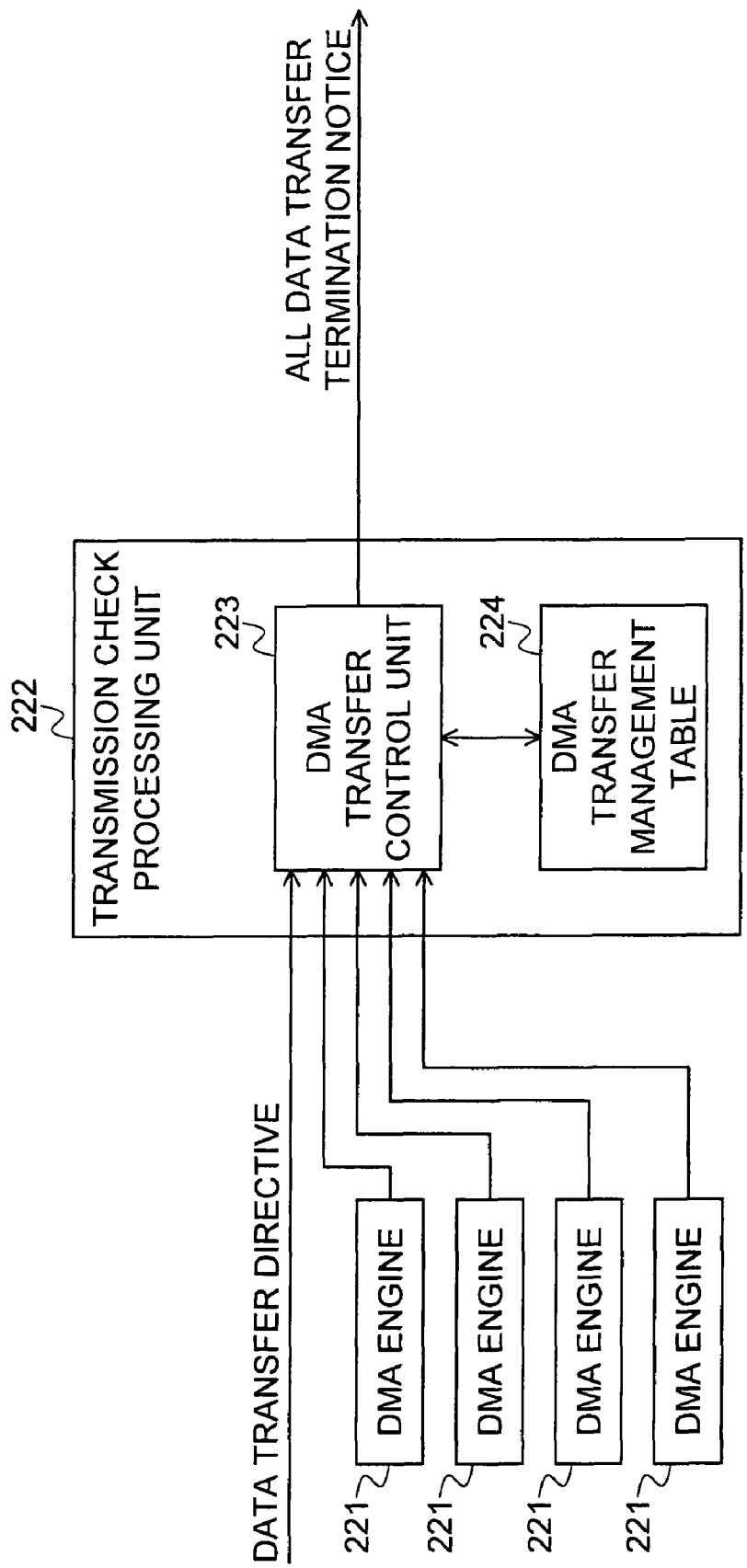

FIG. 11

DMA TRANSFER MANAGEMENT TABLE 224

| TRANSFER DESTINATION | DMA ENGINE | | | | | LAST BLOCK DATA TRANSFER FLAG |
|---|---|---|---|---|---|---|
| | 1 | 2 | 3 | ... | n | |
| TRANSFER DATA A | UNASSIGNED | UNASSIGNED | UNASSIGNED | ... | BEING TRANSFERRED | 0 |
| TRANSFER DATA B | UNASSIGNED | UNASSIGNED | BEING TRANSFERRED | ... | UNASSIGNED | 1 |
| ... | ... | ... | ... | ... | ... | ... |
| TRANSFER DATA X | UNASSIGNED | BEING TRANSFERRED | UNASSIGNED | ... | UNASSIGNED | 0 |

NUMBER OF PIECES OF TRANSFER DATA

DMA ENGINE NUMBER

APPARATUS AND METHOD FOR PERFORMING DMA DATA TRANSFER

CROSS-REFERENCE TO RELATED APPLICATIONS

This application claims the conventional priority based on Japanese Application No. 2006-051872, filed on Feb. 28, 2006, the disclosures of which are incorporated herein by reference.

BACKGROUND OF THE INVENTION

1. Field of the Invention

The present invention generally relates to an apparatus and method for performing DMA data transfer, and more particularly to an apparatus and method for performing DMA data transfer in which a transfer destination device determines the termination of a DMA data transfer when multiple DMA data transfers are performed.

2. Description of the Related Art

DMA (direct memory access) allows data to be transferred without any intervention of a CPU. Therefore, even when the data is transferred between a memory and a device, the CPU can perform other processes concurrently, improving the throughput as a system. In recent years, the bandwidth of the memory (the data transfer capability of the memory) has increased and the bandwidth of the device has increased as in 10 Gbit Ethernet (trademark of IBM Corporation) in the field of data communication, and therefore, higher performance is desired for the DMA as well.

For example, it is known that data is transferred among a plurality of memories at a high speed by continuously performing DMA data transfers (data transfers by the DMA) among the plurality of memories using a transfer number (the number of times of transfer) parameter (refer to Japanese Patent Laid-Open No. 4-236649).

It is also known, for example, that the power consumption of a DMA controller can be reduced by reducing the group of registers for holding addresses (refer to Japanese Patent Laid-Open No. 2003-316722).

In the DMA, large size data can be transferred. In this case, it is necessary that the CPU divides the data into block data of a size in which the DMA controller can transfer the data, and issues a data transfer instruction to the DMA controller continuously. When the data transfer source is mapped by a virtual address, it is necessary to divide the data to prevent one piece of block data from spanning the boundary of the pages of virtual addresses.

The CPU itself also performs a plurality of processes for issuing DMA instruction by a time-sharing operation in processes using multiple threads. As a result, the CPU issues a plurality of (or multiple) DMA requests for different transfer data to a DMA controller.

As described above, a DMA controller increases the number of DMA engines, increases the number of times of data transfer (multiplicity of data transfer) to be concurrently performed, and manages the transfer without fail. Otherwise, the high-performance process cannot be performed. The Inventor studies a DMA data transfer apparatus 200 shown in FIGS. 8 to 11. The DMA data transfer by the DMA data transfer apparatus 200 is briefly described below.

FIG. 8 shows a structure of the DMA data transfer apparatus 200 as the background of the present invention. FIG. 9 shows an operation sequence of the DMA data transfer by the DMA data transfer apparatus shown in FIG. 8.

In the following, one piece of transfer data A is concentrated on and described. When there is a plurality of transfer data, the DMA data transfer described below is concurrently performed on the plurality of transfer data. In the following description, the data divided and transferred by a DMA engine 221 is referred to as block data. The A1, A2, ..., Am (1 to m are positive integers in the descriptions above and below) are block data. The smaller digits, the closer the block data to the head of the transfer data. In FIG. 9, a read of data to each DMA engine 221 from a memory controller 230 is omitted.

The CPU 210 issues a transfer instruction (DMA data transfer request) for the block data A1 (A1 transfer instruction) to the DMA engine 221 to which data transfer has not yet been assigned (step S100). The DMA engine 221 which has received a transfer instruction for the block data A1 transfers the block data A1 to a transfer destination device 240 (step S101). Afterwards, as in the step S100, a CPU 210 issues a transfer instruction for the block data A2 (A2 transfer instruction) (step S102). Upon receipt of the transfer instruction, the DMA engine 221 transfers the block data A2 as in the step S101 (step S103). Then, the block data A1 or A2 is transferred, the DMA engine 221 each issues a transfer termination notice (A1 transfer termination notice or A2 transfer termination notice) to a transmission check processing unit 222 (steps S104 and S105).

As described above, the block data transfer process is performed. The CPU 210 issues a transfer instruction for the first previous block data Am-1 before the last block data Am (Am-1 transfer instruction) as in the step S100 (step S106), and the block data Am-1 is transferred (step S107). Furthermore, the CPU 210 issues a transfer instruction for the last block data Am (Am transfer instruction) as in the step S100 (step S108), and the block data Am is transferred (step S109). At this time, in the step S108, the CPU 210 notifies the DMA engine 221 for transferring the data Am that the data Am is the last block data.

For example, since the size of the last block data Am is smaller than the size of the first previous block data Am-1, the transfer of the block data Am can terminate faster than the transfer of the block data Am-1 as shown in FIG. 9. Therefore, the DMA engine 221 which transfers the block data Am terminates the transfer of the block data Am before the termination of the transfer of the block data Am-1, and issues a last block data transfer termination notice to the transmission check processing unit 222 (step S110). Afterwards, the DMA engine 221 for transferring the block data Am-1 terminates the transfer of the block data Am-1, and issues a transfer termination notice for the block data Am-1 to the transmission check processing unit 222 (step S111).

The transmission check processing unit 222 receives a last block data transfer termination notice from the DMA engine 221 which transferred the block data Am, confirms that all block data has been transferred by receiving the transfer termination notice for the block data Am-1, and then issues an all data transfer termination notice for the transfer data A to the transfer destination device 240 (step S112). The transfer destination device 240 has a data buffer 241 for storing the received block data A1 to Am. Upon receipt of the all data transfer termination notice from the transmission check processing unit 222, the transfer destination device 240 determines that the transfer of the transfer data A has been completed, and performs another process.

To transfer the above-mentioned DMA data, it is necessary for the transmission check processing unit 222 to have a DMA transfer management table 224 with a DMA transfer control unit 223, as shown in FIG. 10. The DMA transfer management table 224 has a management area in a matrix form of the number of transfer data x the number of DMA engines, and has a last block data transfer flag for each piece of transfer data, as shown in FIG. 11. In each of the management area matrices, the status of "unassigned" or "being transferred" is recorded. The last block data transfer flag is set when the DMA transfer control unit 223 receives a last block data transfer termination notice from the DMA engine 221 which transferred the last block data.

In the transmission check processing unit 222, the DMA transfer control unit 223 updates the DMA transfer management table 224. That is, when the DMA engine 221 related to the transfer is assigned by a data transfer instruction from the CPU 210, the status of the portion of the corresponding matrix of the DMA transfer management table 224 is changed from "unassigned" to "being transferred". When the DMA engine 221 which has terminated the transfer of block data is released, the status of the portion of the corresponding matrix of the DMA transfer management table 224 is changed from "being transferred" to "unassigned". When the last block data transfer termination notice is received from the DMA engine 221 which transferred the last block data, the last block data transfer flag of the corresponding transfer data of the DMA transfer management table 224 is changed to "1".

The DMA transfer control unit 223 checks whether or not the last block data transfer flag of each of the transfer data of the DMA transfer management table 224 is "1". The DMA transfer control unit 223 issues an all data transfer termination notice for the corresponding transfer data to the transfer destination device 240, when there is no DMA engine 221 whose status is "being transferred (or in the middle of transferring)" for the transfer data having the last block data transfer flag of "1".

The inventor further studied the DMA data transfer apparatus shown in FIGS. 8 to 11, tried to improve the performance of the DMA controller 220, and knew that the following problems occur with the transmission check processing unit 222.

It is necessary for all DMA engines 221 related to the transfer to check whether or not the transfer of the block data has been completed to the transfer destination device 240. Therefore, when the multiplicity of the DMA engine 221 is enhanced (the number of the DMA engine 221 is increased), the entry of the number of DMA engines, that is, the columns, increases in the DMA transfer management table 224.

When a larger number of transfer data are simultaneously processed, the entry of the number of transfer data, that is, the rows, increases in the DMA transfer management table 224. That is because when there are a large number of transfer data and the transfer data is dynamically managed, the data transfer process cannot be immediately performed in a case where all management entries of the transfer data are being used although the status of some DMA engines 221 is "unassigned".

Also when the number of DMA engines and the number of transfer data that can be simultaneously processed are increased, the related processes also increase. That is, the resources acquiring/releasing process and so on, for assigning the DMA engine 221 that has terminated the transfer of data to the next transfer increases in proportion to the number of DMA engines×the number of transfer data. Therefore, a resultant circuit is complicated.

Furthermore, to improve the performance of the DMA, it is necessary to increase the number of DMA engines and the number of transfer data with appropriate balance between them. However, when the improvement of the performance of the DMA data transfer is performed with increasing number of DMA engines and increasing number of transfer data, the scale of the DMA data transfer circuit becomes large and the circuit becomes complicated as described above.

SUMMARY OF THE INVENTION

It is an object of the present invention to provide an apparatus for performing DMA data transfer which increases the number of DMA engines and the number of transfer data without largely increasing the scale of hardware.

It is another object of the present invention to provide a method for performing DMA data transfer which increases the number of DMA engines and the number of transfer data without largely increasing the scale of hardware.

The apparatus for performing DMA data transfer of the present invention comprises a memory as a data transfer source, a transfer destination device as a data transfer destination, a DMA controller having a plurality of DMA engines each of which transfers data by DMA from the memory to the transfer destination device, and a DMA control unit for directing data transfer by the DMA to the plurality of DMA engines of the DMA controller. The DMA control unit transmits, to the transfer destination device, determination information to determine the termination of the data transfer on data to be transferred, and the transfer destination device determines the termination of the data transfer on the data to be transferred based on the determination information transmitted from the DMA control unit.

Preferably, in the apparatus of the present invention, after all data transfer number which is a transfer number required to transfer the data to be transferred is finalized, the DMA control unit transmits the determination information generated based on the finalization result to the transfer destination device.

Preferably, in the apparatus of the present invention, the determination information comprises a number of transfer of all data as a number of transfer required to transfer the data to be transferred. And, the transfer destination device comprises a data transfer number counter counting the number of data transfer completed for the data to be transferred, and an all data transfer number holding unit holding the number of transfer of all data, and determines that the data transfer of the data to be transferred has been completed when a value of the data transfer number counter reaches the number of transfer of all data.

Preferably, in the apparatus of the present invention, the transfer destination device comprises a data transfer number counter counting a number of data transfer completed for the data to be transferred. And, the determination information comprises a data transfer number deficit value as a value obtained by subtracting a number of transfer of all data as a necessary number of transfer of the data to be transferred from a counter MAX value as a maximum value countable by the data transfer number counter. And, the transfer destination device adds the data transfer number deficit value to a value of the data transfer number counter, and determines that the data transfer of the data to be transferred has terminated when the value of the data transfer number counter reaches the counter MAX value.

Preferably, in the apparatus of the present invention, the memory comprises a first memory storing data generated by a user, and a second memory storing data whose contents are predetermined, and the second memory is positioned closer to the DMA control unit than the first memory.

The method for performing DMA data transfer of the present invention is a method for performing DMA data transfer implemented by an apparatus for performing DMA data transfer including a DMA controller having a plurality of DMA engines each of which transfers data from a memory to a transfer destination device and a DMA control unit for directing data transfer by DMA to the plurality of DMA engines of the DMA controller. The method for performing DMA data transfer comprises determining, in the DMA control unit, a division size of data to be transferred such that the plurality of DMA engines can transfer the data, and directing data transfer by the DMA to the plurality of DMA engines of the DMA controller, dividing, in the plurality of DMA engines of the DMA controller, the data to be transferred, and transferring the data to the transfer device according to an instruction of the DMA control unit, transmitting, in the DMA control unit, the determination information for determination of termination of the data transfer for the data to be transferred to the transfer destination device, and determining, in the transfer destination device, termination of the data transfer for the data to be transferred based on the determination information transmitted from the DMA control unit.

In the apparatus and method for performing DMA data transfer according to the present invention, the transfer destination device determines the termination of data transfer based on the determination information transmitted from the DMA control unit. That is, according to the present invention, the transfer destination device has the function of determining the termination of the data transfer. Thus, it is unnecessary for the DMA controller to have the circuit (for example, the transmission check processing unit 222 shown in FIGS. 8 and 10) for determining the termination of the data transfer. Therefore, when the DMA controller enhances the multiplicity of the DMA engine to improve the performance of the DMA data transfer, it is necessary only to add a DMA engine, and no other hardware is required to be added. Furthermore, although the number of transfer data increases, it is necessary only to add the function of determining the termination of the data transfer in the transfer destination device, and no other hardware is to be added. Therefore, for example, it is not necessary to prepare a DMA transfer management table of the number of DMA engines×the number of transfer data, thereby successfully minimizing the circuit.

According to an embodiment of the apparatus for performing DMA data transfer of the present invention, the DMA control unit transmits the determination information generated based on the number of transfer of all data to the transfer destination device. Thus, the transfer destination device receives the determination information before the termination of data transfer, and can correctly determine the termination of data transfer.

According to an embodiment of the apparatus for performing DMA data transfer of the present invention, since the determination information comprises the number of transfer of all data, it can be determined that the data transfer has terminated only by counting the number of transfer of data. Thus, the transfer destination device easily determines the termination of the data transfer without a specifically complicated circuit or processes.

According to an embodiment of the apparatus for performing DMA data transfer of the present invention, since the determination information comprises the data transfer number deficit value, it can be determined that the data transfer has terminated when the value of the data transfer number counter reaches the counter MAX value. Thus, since it is not necessary to hold the number of transfer of all data, the structure of the circuit of the transfer destination device can be simpler.

Furthermore, according to an embodiment of the apparatus for performing DMA data transfer of the present invention, the second memory is arranged closer to the DMA control unit than the first memory. Thus, the transfer time of the data such as header information whose contents are predetermined can be reduced.

BRIEF DESCRIPTION OF THE DRAWINGS

FIG. 9 shows an operation sequence of the DMA data transfer by the DMA data transfer apparatus shown in FIG. 8.

FIG. 10 shows an example of a structure of a transmission check processing unit provided for the DMA data transfer apparatus shown in FIG. 8.

FIG. 11 shows an example of a DMA transfer management table provided for the DMA data transfer apparatus shown in FIG. 8.

DETAILED DESCRIPTION OF THE PREFERRED EMBODIMENTS

Figure 1:
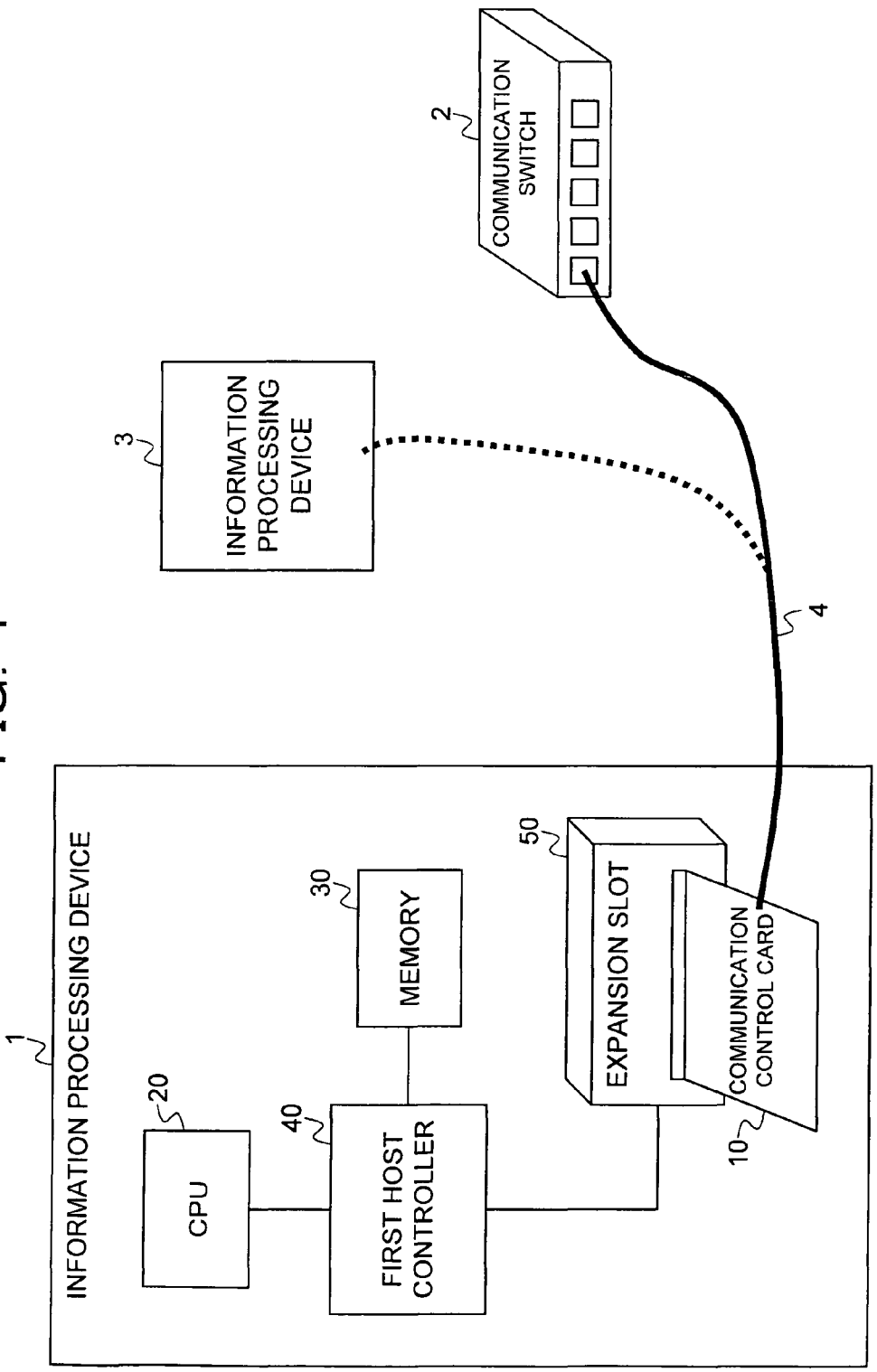
FIG. 1 shows an example of a structure of an information processing device according to the present invention.
Figure 2:
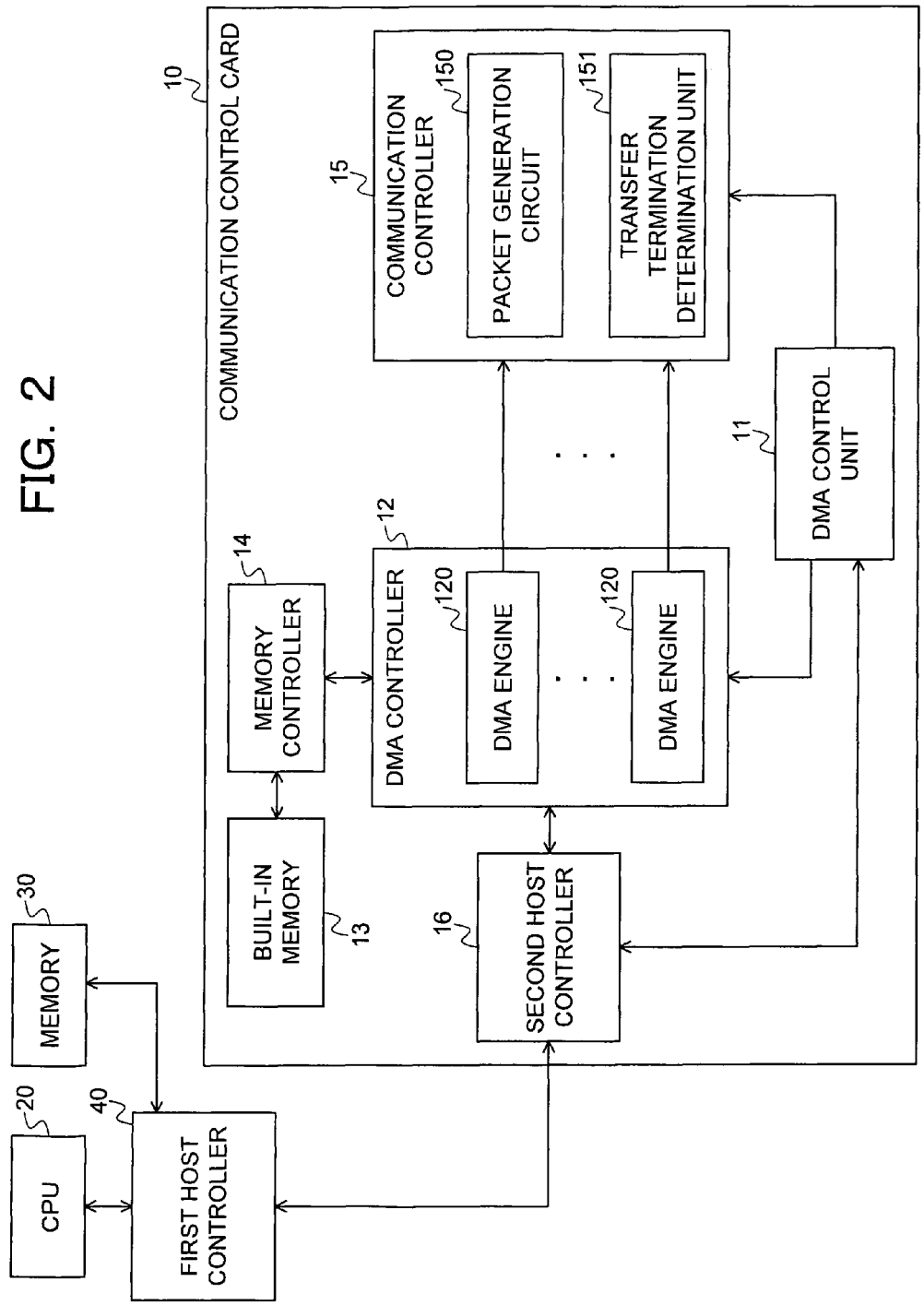
FIG. 2 shows an example of a structure of a communication control card according to an embodiment of the present invention.

FIGS. 1 and 2 show diagrams of a structure of an apparatus for performing DMA data transfer according to an embodiment of the present invention, and show the structure of the apparatus for performing DMA data transfer according to an embodiment of the present invention. Specifically, FIG. 1 shows an example of a structure of an information processing device according to the present invention, and FIG. 2 shows an example of a structure of a communication control card according to the present invention.

In FIG. 1, an information processing device 1 is, for example, a computer independently operating by itself, and includes a CPU (Central Processing Unit) 20, a memory 30, a first host controller 40, and an expansion slot 50. At least one expansion slot 50 is provided, and it is also possible to provide a plurality of expansion slots 50, not shown. The CPU 20 performs control and arithmetic operations of the entire information processing device 1. The memory (a first memory) 30 includes, for example, an external storage device, and stores, for example, various data (or data of a large capacity) generated by a user. The memory 30 is a data transfer source in the DMA data transfer. The first host controller 40 is connected to the CPU 20, the memory 30, and the expansion slot 50 (therefore, a communication control card 10), and performs communications between them. The expansion slot 50 is used in connecting a device for realizing various functions to be added to the information processing device 1, and is provided with various expansion cards (or expansion board).

In this example, as an example of the expansion card, the communication control card 10 having the function of DMA data transfer is loaded. The communication control card 10 is connected to an external communication switch 2 for the information processing device 1, for example, through a communication medium 4 such as a connection wire, optical fiber and so on. The information processing device 1 is connected to another information processing device 3 through the communication switch 2. Otherwise, the communication control card 10 can be directly connected to another information processing device 3 as indicated by the dotted line in FIG. 1. Thus, the information processing device 1 is connected to the communication switch 2 or another information processing device 3 through the communication control card (expansion card) 10, and performs communications with them.

In FIG. 2, the communication control card 10 has a DMA control unit 11, a DMA controller 12, a built-in memory 13, a memory controller 14; a communication controller 15, and a second host controller 16. The DMA controller 12 includes a plurality of DMA engines 120. The communication controller 15 includes a packet generation circuit 150 and a transfer termination determination unit 151.

The DMA control unit 11 includes a CPU loaded into the communication control card 10, and controls the entire communication control card 10. Upon receipt of a data transfer directive from the CPU 20 of the information processing device 1, the DMA control unit 11 determines the division size of data to be transferred (hereinafter referred to as transfer data) from the memory 30 or the built-in memory 13 such that the DMA engine 120 can transfer the data, and directs (a plurality of DMA engines 120 of) the DMA controller 12 to transfer data by the DMA. The transferable size (maximum length of data) for the DMA engine 120 is predetermined, and equal for each DMA engine 120.

The DMA control unit 11 transmits the determination information to determine the termination of the data transfer to the communication controller 15 for the transfer data. Practically, when the number of data transfer for each piece of transfer data (number "m" of transfer of all data) is finalized, the DMA control unit 11 notifies the transfer termination determination unit 151 of the determination information for each piece of transfer data. That is, for each of the plurality of transfer data, the determination information is transmitted.

The DMA controller 12 practically transfers data by the DMA. Therefore, the DMA controller 12 includes a plurality of DMA engines 120. The plurality of DMA engines 120 each divide the transfer data from the memory 30 of the information processing apparatus 1 or the built-in memory 13 according to the directive from the DMA control unit 11, and transfer the block data of the divided transfer data to the communication controller 15. In the following description, each portion of the transfer data divided and transferred by each DMA engine 120 is referred to as block data.

The built-in memory (a second memory) 13 stores data whose contents are predetermined such as the header information of a packet. The built-in memory 13 is a data transfer source in the DMA data transfer. Since the built-in memory 13 is physically closer to the CPU (and DMA controller 12) as the DMA control unit 11 than the memory 30, it can be regarded as a cache memory. The memory controller 14 controls the data transfer between the built-in memory 13 and the DMA controller 12.

The communication controller 15 is a transfer destination device, and the data transfer destination in the DMA data transfer. In the communication controller 15, when transferred block data are all presented, the packet generation circuit 150 generates a packet based on them, and externally transmits a generated packet. Thus, the communication, controller 15 performs packet communications with the communication switch 2 or other information processing devices 3. The transfer termination determination unit 151 determines the termination of the data transfer for the transfer data based on the determination information transmitted from the DMA control unit 11. Practically, the transfer termination determination unit 151 determines the termination of the data transfer based on the determination information for each piece of transfer data received from the DMA control unit 11. That is, it determines the termination of the data transfer for each of the plurality of transfer data. When the transfer termination determination unit 151 determines that the data transfer has terminated, it notifies the packet generation circuit 150 of the termination. In response to the notification, for example, the packet generation circuit 150 transmits a packet.

The second host controller 16 performs communication with the first host controller 40 of the information processing device 1. The data transfer directive from the CPU 20 of the information processing device 1 is transmitted to the DMA control unit 11 through the first host controller 40 and the second host controller 16. The data transferred from the memory 30 of the information processing device 1 is transmitted to the DMA controller 12 through the first host controller 40 and the second host controller 16.

The second host controller 16 is connected to the first host controller 40 of the information processing device 1 through the expansion slot 50. The second host controller 16 is connected to the DMA control unit 11 and the DMA controller 12 via an internal bus. The DMA controller 12 is connected to the memory controller 14 via the internal bus. The communication controller 15 is connected to the DMA control unit 11 and the DMA controller 12 via the internal bus.

Figure 3:
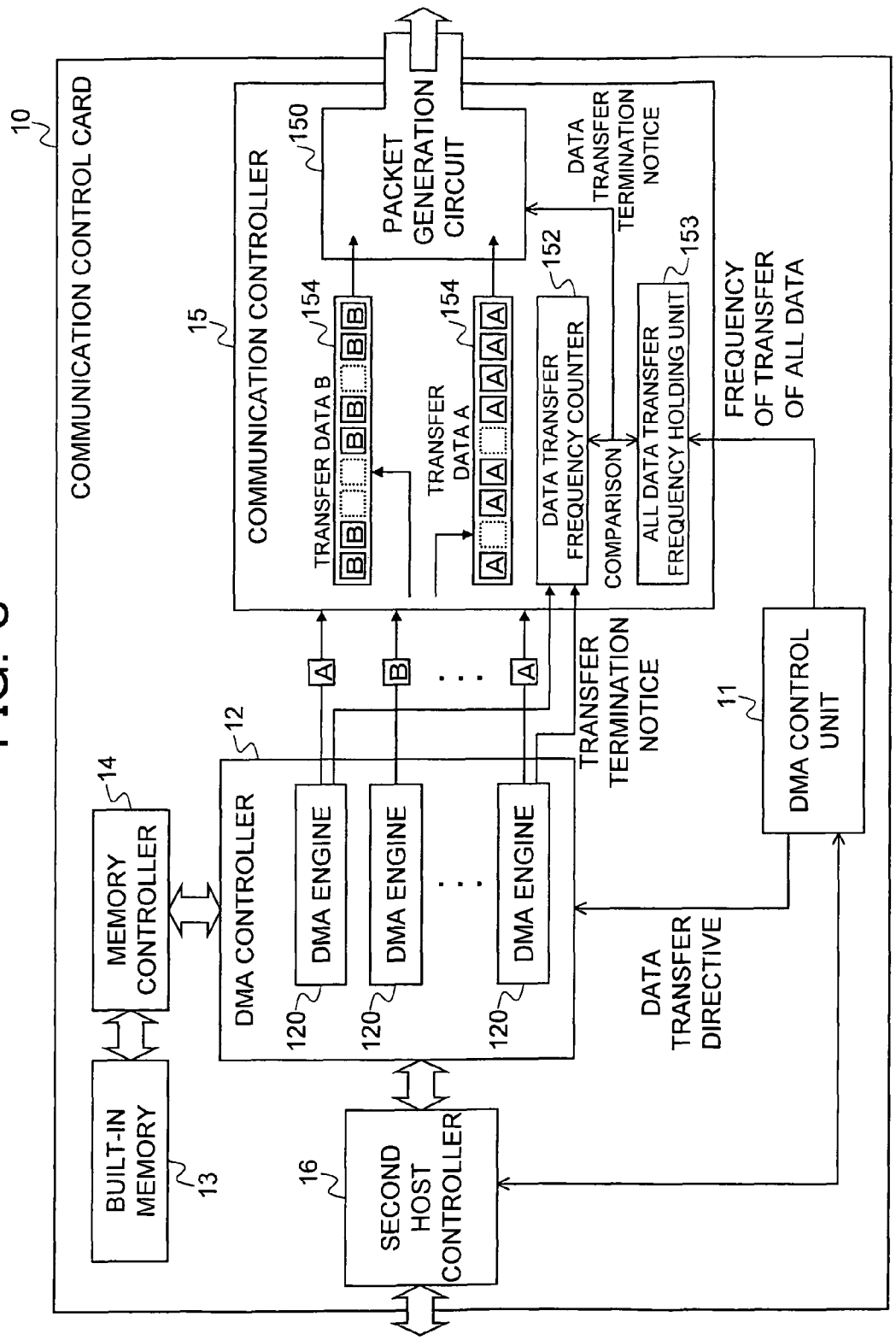
FIG. 3 is an explanatory view of an example of a DMA data transfer according to the present invention.

FIG. 3 is an explanatory view of an example of the practical structure of the communication control card 10 having the DMA data transfer function according to an embodiment of the present invention.

In this example, the determination information includes the number "m" of transfer of all data as the number of transfer required to transfer data. Based on this, the transfer termination determination unit 151 in this example includes a data transfer number counter 152 and an all data transfer number holding unit 153. The data transfer number counter 152 and the all data transfer number holding unit 153 are provided for each data buffer 154 (that is, for each transfer data).

The DMA control unit 11 interprets the communication command from the information processing device 1, determines the division size of the transfer data such that each DMA engine 120 can transfer the data, and issues a directive to transfer data by the DMA to the DMA controller 12. When the number "m" of transfer of all data is finalized, the DMA control unit 11 notifies the communication controller 15 of it. The number "m" of transfer of all data is the necessary number of transfer to transfer the entire transfer data.

The communication controller 15 which is a transfer destination device includes the data buffer 154 for storing transferred block data for each piece of transfer data. The data buffer 154 is a memory area accessible by (the DMA engine 120 of) the DMA controller 12 for each piece of transfer data. The communication controller 15 includes the data transfer number counter 152 and the all data transfer number holding unit 153 as the transfer termination determination unit 151. The data transfer number counter 152 counts the number of data transfer terminated for the transfer data. The all data transfer number holding unit 153 holds the number "m" of transfer of all data transmitted from the DMA control unit 11.

The data transfer number counter 152 counts the number of data transfer (that is, the number of transfer termination notices from the DMA engine 120) from the DMA controller 12 for each piece of transfer data. The communication controller 15 (or the data transfer number counter 152) compares the value of the data transfer number counter 152 with the stored number "m" of transfer of all data, and determines the termination of data transfer when they match (that is, the value of the data transfer number counter reaches the number of transfer of all data), and transmits a data transfer termination notice to the packet generation circuit 150. Therefore, the "termination of data transfer" to be determined by the transfer termination determination unit 151 is not the termination of data transfer in each DMA engine 120, but the termination of the transfer of all data (all block data) of one piece of transfer data.

Next, based on the structure shown in FIG. 3, the DMA data transfer according to an embodiment of the present invention is described. The description is given below with the attention centering on one piece of transfer data A. When there is a plurality of transfer data A and B, the DMA data transfer described below is concurrently performed on the plurality of transfer data A and B. In this case, there is provided the data buffer 154 for the transfer data B, and the data transfer number counter 152 and the all data transfer number holding unit 153 are provided correspondingly.

The CPU 20 of the information processing device 1 issues a packet transmit instruction. The packet transmit instruction is transmitted to the second host controller 16 of the communication control card 10 through the first host controller 40 of the information processing device 1. The DMA control unit 11 receives a packet transmit instruction from the second host controller 16, and reads a communication command in the memory 30 of the information processing device 1 through the second host controller 16 and the first host controller 40. Then, the DMA control unit 11 interprets the read communication command, determines the division size of the transfer data such that the DMA engine 120 can transfer the data, and issues a data transfer directive to the DMA controller 12.

Figure 4:
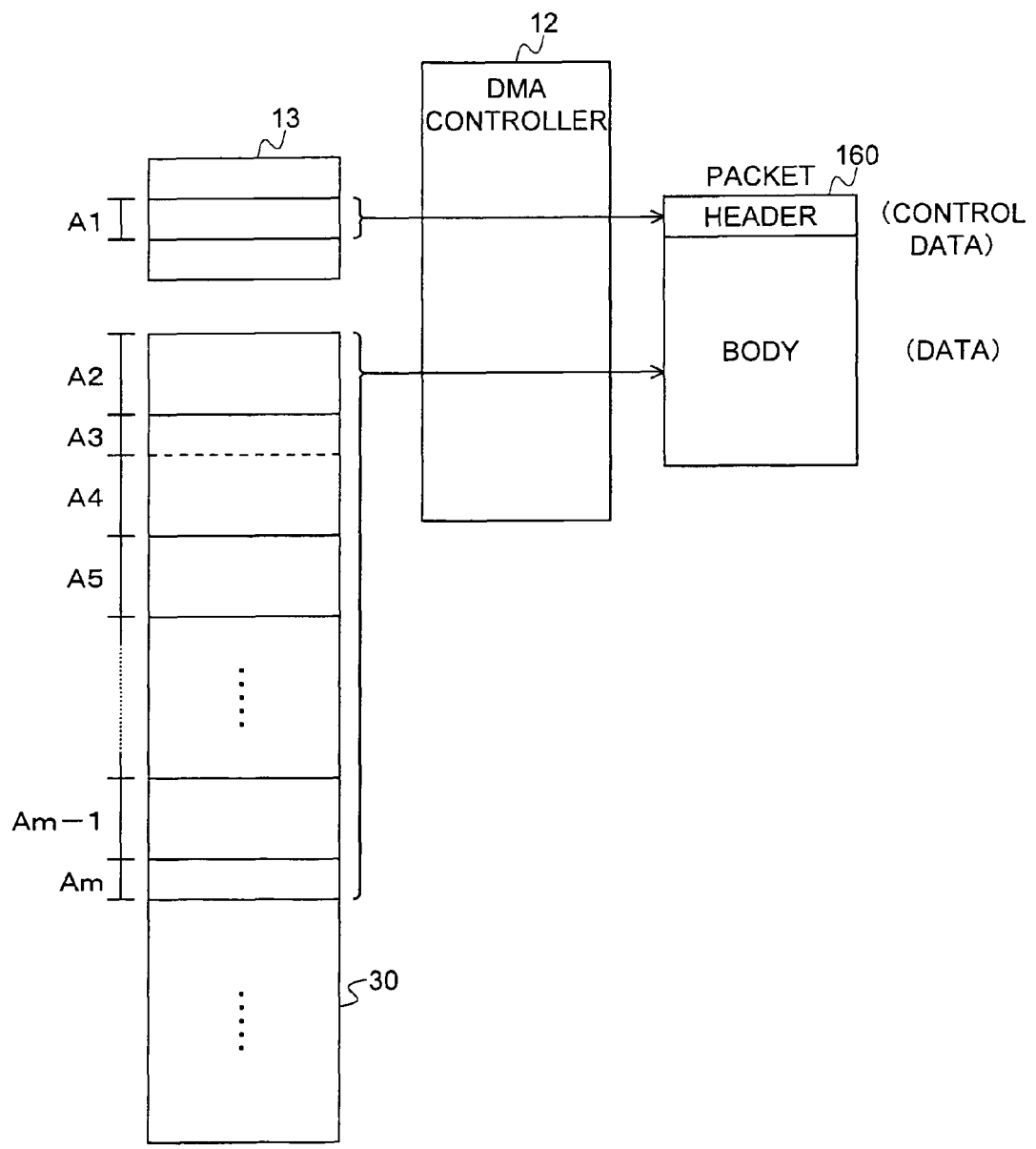
FIG. 4 is an explanatory view of the DMA data transfer according to the present invention.

The DMA engine 120 in the DMA controller 12 each reads the block data from the built-in memory 13, for example, through the memory controller 14 according to a directive from the DMA control unit 11, and transfers the block data to the communication controller 15. For example, as shown in FIG. 4, the block data A1 is read from the built-in memory 13. Thus, the packet generation circuit 150 forms the header (control data) of a packet 160 with the data transferred from the built-in memory 13.

Furthermore, the DMA engine 120 each reads the block data from the memory 30 of the information processing device 1 through the second, for example, host controller 16 according to a directive from the DMA control unit 11, and transfers it to the communication controller 15. For example, as shown in FIG. 4, the block data A2 to Am are read from the memory 30. Thus, the packet generation circuit 150 forms the body (actual data) of the packet 160 with the data transferred from the memory 30. Thus, the packet 160 is generated.

Each of the plural DMA engines 120 is concurrently operated, and the block data transferred by each of the plurality of DMA engines 120 have different data lengths as shown in FIG. 4. Therefore, as the data Am-1 and Am shown in FIG. 5, there can be a case where the order of the data transfer directives from the DMA control unit 11 does not match the order in which the data transfer terminates because, for example, as shown in FIG. 4, the data Am-1 is the longest block data while the data Am is block data of remaining small sizes.

In FIG. 4, the block data A2, A4, A5, and Am-1 have the largest size of the block data while the block data A1, A3, and Am have the size smaller than the largest size for each reason.

When the DMA control unit 11 issues a data transfer directive, it normally determines the division size of the transfer data such that the size can be the maximum that can be transferred by the DMA engine 120. However, as shown in FIG. 4, when the transfer data spans the boundary (indicated by a dotted line) of the pages in the memory 30, the block data A3 is divided into a size smaller than the largest size transferable by the DMA engine 120 so that the block data cannot span the boundary of pages. Therefore, the period in which the number "m" of transfer of all data is determined depends on the transfer data, and is uncertain. In many cases, the number "m" of transfer of all data is determined when data is transferred to the point close to the end of the transfer data.

Therefore, in the present invention, the DMA control unit 11 determines the division size of the transfer data such that the data of the size can be transferred by the plurality of DMA engines, finalizes the number "m" of transfer of all data based on the determination result, and generates the determination information based on the finalization result. In the example shown in FIG. 3, the DMA control unit 11 notifies the communication controller 15 of the number "m" of transfer of all data as the determination information when the number "m" of transfer of all data is finalized (or after it is finalized).

The communication controller 15 (or the data transfer number counter 152) determines that the data transfer of the transfer data has terminated and transmits the packet 160 when the number of data transfer from the DMA controller 12 reaches the number "m" of transfer of all data, that is, the value of the data transfer number counter 152 reaches the number "m" of transfer of all data.

Figure 5:
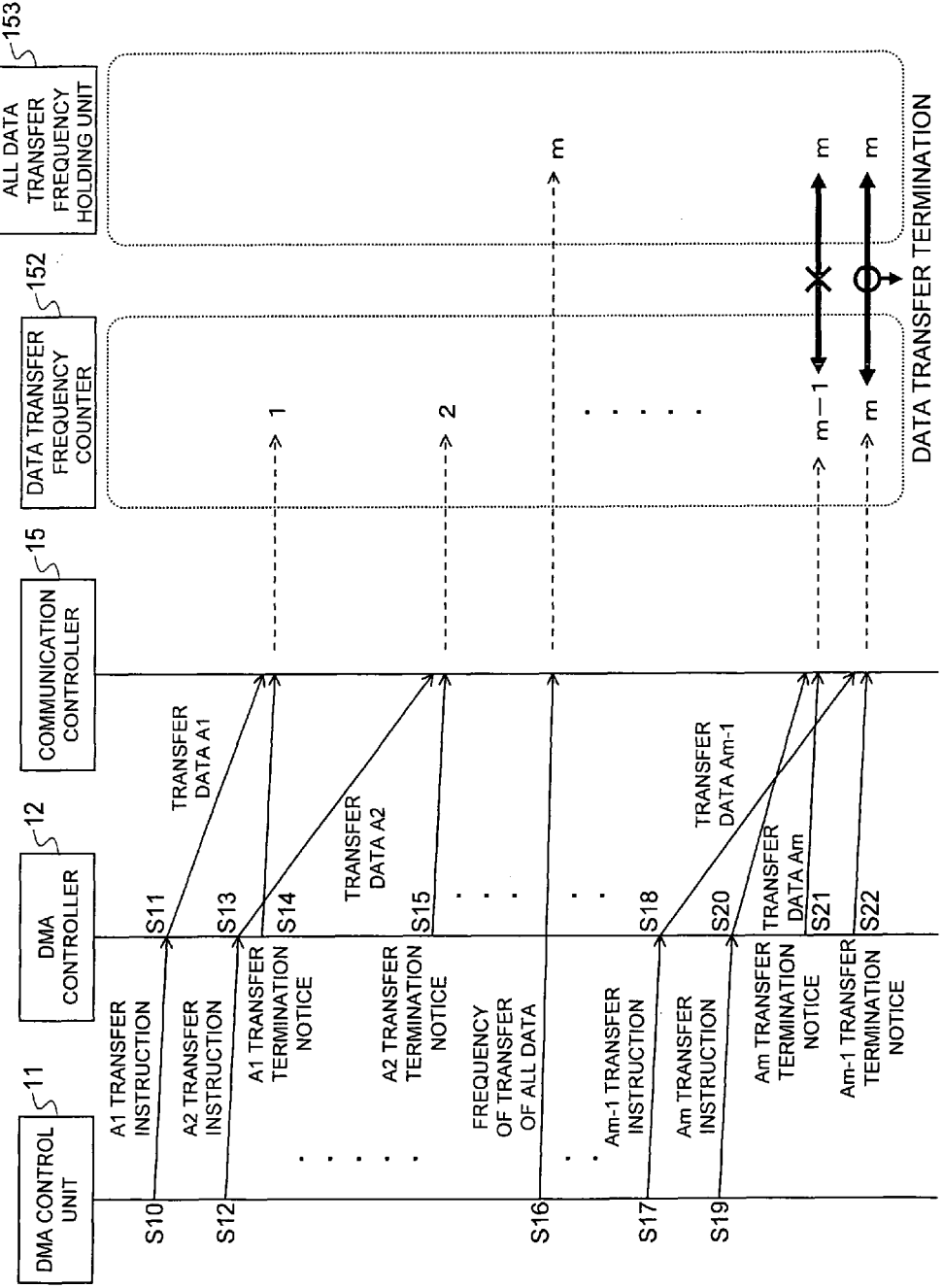
FIG. 5 shows an example of an operation sequence of the DMA data transfer according to the present invention.

FIG. 5 shows an operation sequence of the DMA data transfer according to the present invention in the example shown in FIG. 3. The operation sequence shown in FIG. 5 shows an example of the DMA data transfer for the transfer data A.

In the following description, A1, A2, . . . , and Am are block data. The smaller the number is, the closer to the head of the transfer data the block data is. In FIG. 5, a packet transmit instruction from the CPU 20 to the DMA control unit 11 and a read of data from the memory 30 or the built-in memory 13 to the DMA engine 120 are omitted. FIG. 5 shows the DMA data transfer of one piece of transfer data A, but actually plural transfer data, A, B, . . . are concurrently transferred by the DMA.

The DMA control unit 11 determines the division size of the transfer data A such that the data can be transferred by the DMA engine 120, and issues to the DMA controller 12 a data transfer directive (DMA data transfer request) to divide the transfer data A into a specified size and transfer the transfer data A. That is, the DMA control unit 11 issues a transfer instruction for the block data A1 (A1 transfer instruction) to the DMA controller 12 (step S10). In the instruction, the built-in memory 13 or the memory 30 as a data transfer source, and a transfer destination device as a data transfer destination, for example, the communication controller 15, is also specified.

In the DMA controller 12, the DMA engine 120 each transfers data by the DMA according to a directive of the DMA control unit 11. For example, the DMA controller 12 receives a transfer instruction for the block data A1, and transfers the block data A1 to the communication controller 15 using the DMA engine 120 not yet assigned data transfer (step S11). Specifically, the DMA engine 120 reads the block data A1 by issuing a read request to the memory controller 14, and transfers the block data A1 to the communication controller 15. Whether or not a data transfer is assigned to the DMA engine 120 can be detected by setting for each DMA engine 120 a flag indicating whether or not it is assigned.

Afterwards, as in the step S10, the DMA control unit 11 issues a transfer instruction for the block data A2 (A2 transfer instruction) (step S12). Upon receipt of the transfer instruction for the block data A2, the DMA controller 12 transfers the block data A2 as in the step S11 (step S13). The DMA engine 120 which terminates the data transfer for the block data A1 or A2 each issues the transfer termination notice (A1 transfer termination notice or A2 transfer termination notice) to the communication controller 15 (steps S14 and Sl5). Correspondingly, the data transfer number counter 152 counts the number of data transfer.

The DMA control unit 11 notifies the communication controller 15 of the number "m" of transfer of all data when the number "m" of transfer of all data is finalized (step S16). In response to this, the all data transfer number holding unit 153 holds the number "m" of transfer of all data transmitted from the DMA control unit 11. Afterwards, the communication controller 15 compares the value of the data transfer number counter 152 with the number "m" of transfer of all data. When they match, it is determined that the data transfer has terminated.

As described above, the block data transfer process is performed. The DMA control unit 11 issues a transfer instruction for the block data Am-1 (Am-1 transfer instruction) as in the step S10 (step S17). Upon receipt of the transfer instruction for the block data Am-1, the DMA controller 12 transfers the block data Am-1 as in the step S11 (step S18). Then, the DMA control unit 11 issues a transfer instruction for the block data Am (Am transfer instruction) as in the step S10 (step S19). Upon receipt of the transfer instruction for the block data Am, the DMA controller 12 transfers the block data Am as in the step S11 (step S20).

When the block data Am is completely transferred, the DMA controller 12 issues a transfer termination notice (Am transfer termination notice) to the communication controller 15 (step S21). In this example, since the last block data Am is smaller than the first previous block data Am-1, the data transfer for the block data Am is completed faster than the data transfer for the block data Am-1. Therefore, the value of the data transfer number counter 152 at this point is m-1, and has not reached the number "m" of transfer of all data.

When the data transfer for the block data Am-1 is completed, the DMA controller 12 issues a transfer termination notice (Am-1 transfer termination notice) to the communication controller 15 (step S22). At this point, the value of the data transfer number counter 152 is m, and matches the number "m" of transfer of all data. Then, the transfer termination determination unit 151 (data transfer number counter 152) determines that the data transfer for the transfer data A has terminated.

Figure 6:
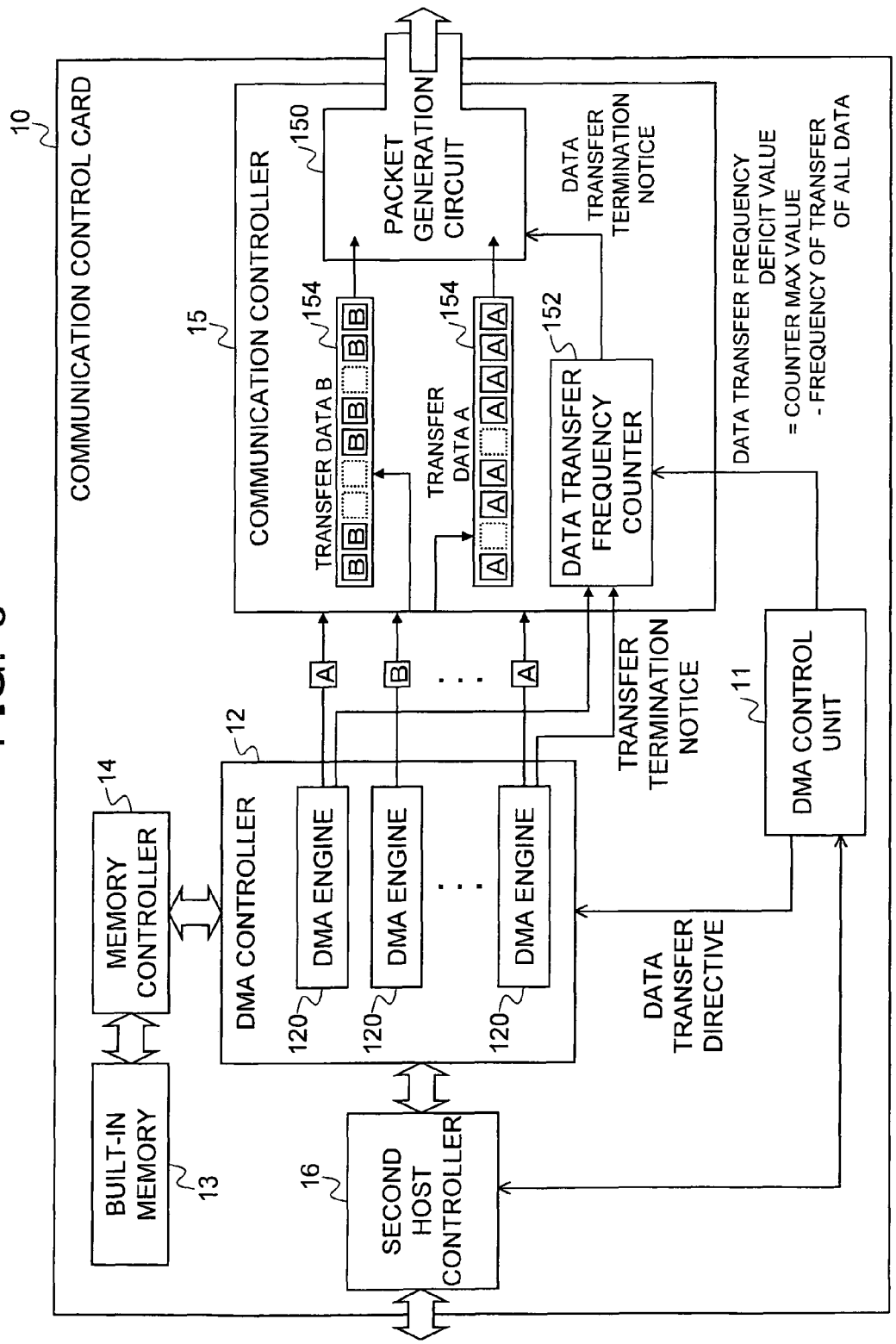
FIG. 6 is an explanatory view of another example of the DMA data transfer according to the present invention.

FIG. 6 is an explanatory view showing another example of the practical structure of the communication control card 10 having the function of DMA data transfer according to an embodiment of the present invention. FIG. 6 corresponds to FIG. 3, and therefore the description of the same portion shown in FIG. 3 is omitted.

This example shows the determination information including the data transfer number deficit value obtained by subtracting the number "m" of transfer of all data from the counter MAX value. The counter MAX value is the maximum value countable by the data transfer number counter 152. The counter MAX value equals the maximum value of the permitted number of data transfer in the data transfer by the DMA. Correspondingly, the transfer termination determination unit 151 of the example includes only the data transfer number counter 152 as the transfer termination determination unit 151. The data transfer number counter 152 is provided for each data buffer 154 (that is, transfer data).

The DMA control unit 11 notifies the communication controller 15 of the value (hereinafter referred to as a data transfer number deficit value) obtained by subtracting number "m" of transfer of all data from the counter MAX value when the number "m" of transfer of all data is finalized. The communication controller 15 (data transfer number counter 152) adds the notified data transfer number deficit value to the value of the data transfer number counter 152 at the time, and determines that the data transfer of the transfer data has terminated when the value reaches the counter MAX value. Afterwards, the data transfer number counter 152 continues counting the number of data transfer, determines that the data transfer has terminated when the count value reaches the counter MAX value, and transmits the data transfer termination notice to the packet generation circuit 150.

For example, assume that the counter MAX value is 16, and the number "m" of transfer of all data of the transfer data A is 10. The data transfer number counter 152 counts the number of times 1, 2, . . . of data transfer each time the transfer terminates for the block data A1, A2, . . . . When the number "m" of transfer of all data is finalized by the DMA control unit 11, the value obtained by subtracting the number "m" of transfer of all data from the counter MAX value, that is, 16−10=6, is transmitted to the communication controller 15 as a data transfer number deficit value. Assume that the data transfer number deficit value is transmitted when the value of the data transfer number counter 152 is 6. In this case, the data transfer number deficit value is added to the value of the data transfer number counter 152, and the value of the data transfer number counter 152 is set as 6+6=12. Afterwards, the data transfer number counter 152 continues counting 13, 14, . . . each time block data is completely transferred, and determines that the data transfer has terminated when the value of the data transfer number counter 152 reaches the counter MAX value, that is, 16.

Next, based on the structure shown in FIG. 6, the DMA data transfer according to an embodiment of the present invention is described. That is, as in the example shown in FIG. 3, according to a packet transmit instruction from the CPU 20 of the information processing device 1, the DMA control unit 11 issues a data transfer directive to the DMA controller 12. The DMA engine 120 of the DMA controller 12 each reads the block data from the built-in memory 13 or the memory 30 based on the directive from the DMA control unit 11, and transfers it to the communication controller 15. The data transfer number counter 152 counts the number of data transfer from the DMA controller 12.

The DMA control unit 11 notifies the communication controller 15 of the value obtained by subtracting the number "m" of transfer of all data from the counter MAX value, that is, the data transfer number deficit value, when the number "m" of transfer of all data is finalized. The communication controller 15 adds the data transfer number deficit value received from the DMA control unit 11 to the data transfer number counter 152. Afterwards, the data transfer number counter 152 continues counting the number of data transfer from the DMA controller 12, determines that the data transfer has terminated for the transfer data when the count value reaches the counter MAX value, and transmits the packet 160.

Figure 7:
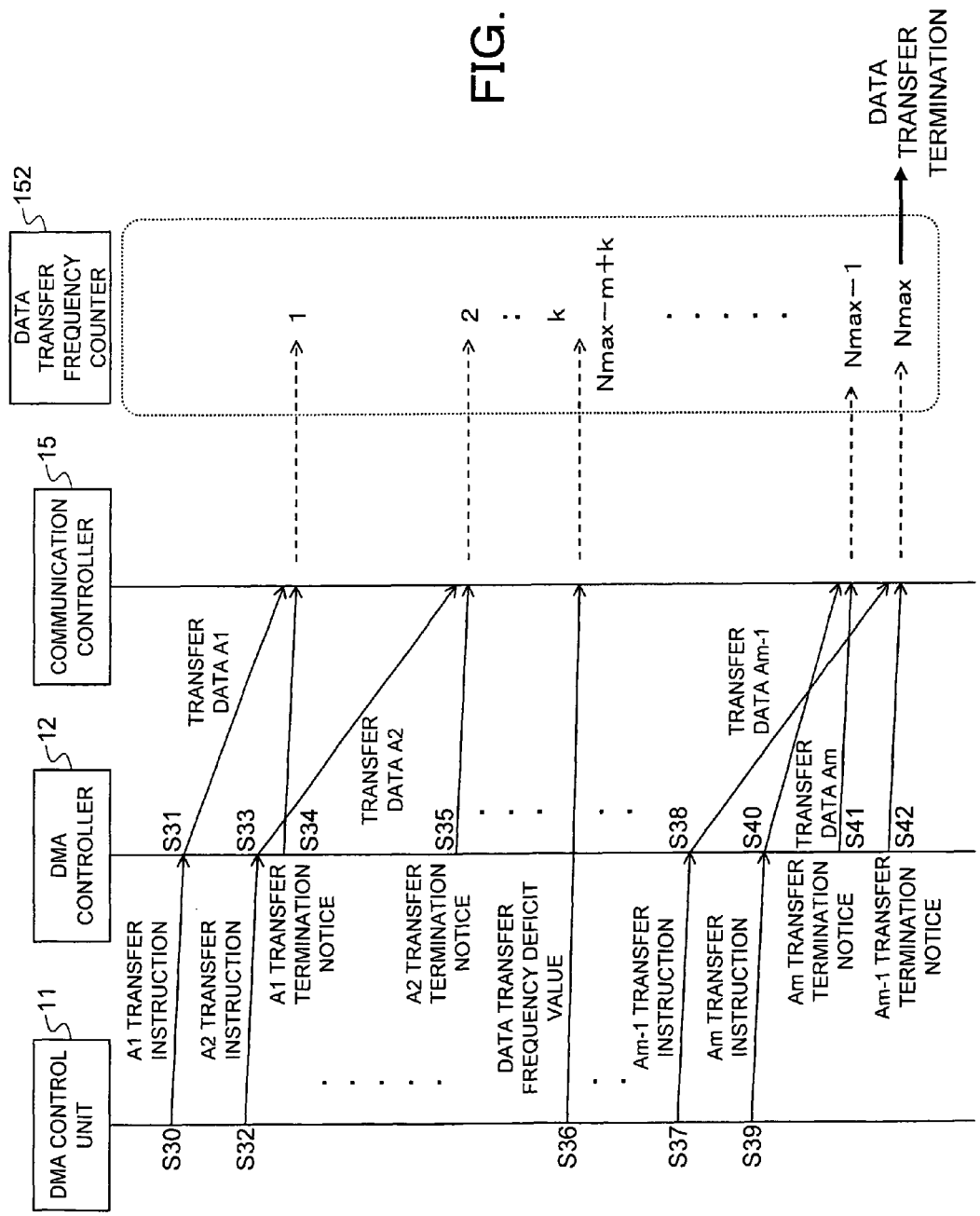
FIG. 7 shows another example of an operation sequence of the DMA data transfer according to the present invention.
Figure 8:
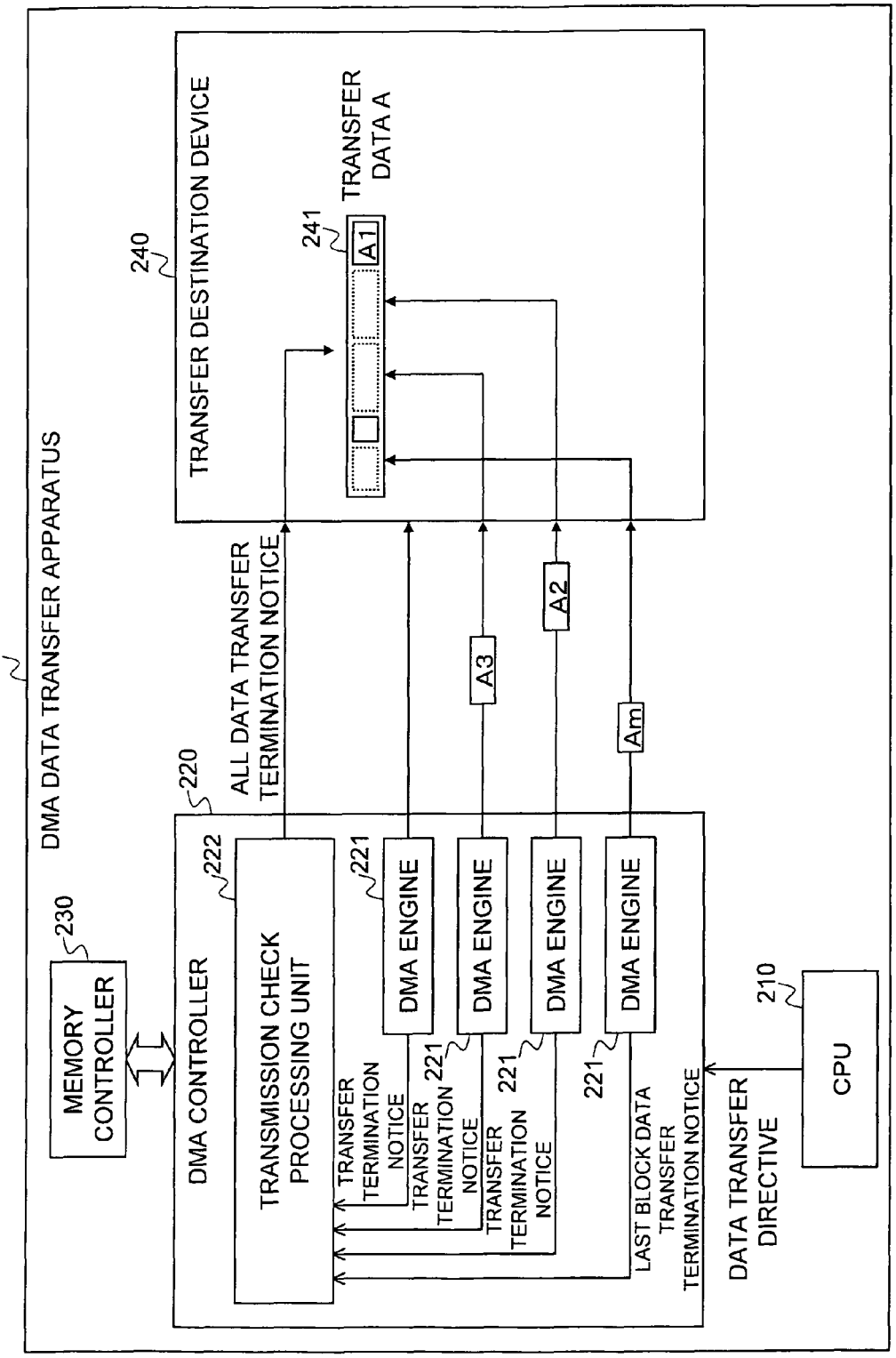
FIG. 8 shows the DMA data transfer apparatus as the background of the present invention.

FIG. 7 shows another example of the operation sequence of the DMA data transfer of the present invention according to the example shown in FIG. 6. FIG. 7 corresponds to FIG. 5, and the description of the same portion also shown in FIG. 5 is omitted.

The DMA control unit 11 issues a transfer instruction for the block data A1 (A1 transfer instruction) to the DMA controller 12 (step S30) as in the step S10, and the DMA controller 12 which receives the transfer instruction for the block data A1 transfers the block data A1 as in the step S11 (step S31). Then, the DMA control unit 11 issues a transfer instruction for the block data A2 (A2 transfer instruction) as in the step S12 (step S32). The DMA controller 12 which receives the transfer instruction for the block data A2 transfers the block data A2 as in the step S13 (step S33). Then, the DMA controller 12 which completes data transfer for the block data A1 or A2 notifies the communication controller 15 of the transfer termination notice (A1 transfer termination notice or A2 transfer termination notice) (step S34, step S35). In response to this, the data transfer number counter 152 counts the number of data transfer.

The DMA control unit 11 notifies the communication controller 15 of the data transfer number deficit value (Nmax−m) when the number "m" of transfer of all data is finalized (step S36). In response to this, the data transfer number deficit value (Nmax−m) is added to the value k of the data transfer number counter 152. Thus, the value of the data transfer number counter 152 is Nmax−m+k. Afterwards, the data transfer number counter 152 continues counting the transfer termination notices each time a transfer termination notice is received from the DMA controller 12.

As described above, the process of transferring block data is performed. Then, the DMA control unit 11 issues a transfer instruction for the data Am-1 (Am-1 transfer instruction) (step S37) as in the step S17, and the DMA controller 12 which receives a transfer instruction for the block data Am-1 transfers the data Am-1 (step S38) as in the step S18. Afterwards, the DMA control unit 11 issues a transfer instruction for the block data Am (Am transfer instruction) (step S39) as in the step S19. The DMA controller 12 which receives the transfer instruction for the block data Am transfers the block data Am (step S40) as in the step S20.

When the transfer of the block data Am terminates, the DMA controller 12 gives the transfer termination notice (Am transfer termination notice) to the communication controller 15 (step S41). As described above, the transfer of the block data Am terminates faster than the transfer for the block data Am-1. Therefore, the value of the data transfer number counter 152 at this point is Nmax-1, and has not reached the counter MAX value.

When the data transfer of Am-1 terminates, the DMA controller 12 issues a transfer termination notice (Am-1 transfer termination notice) to the communication controller 15 (step S42). At this time, the value of the data transfer number counter 152 reaches Nmax. Then, the communication controller 15 (data transfer number counter 152) determines that the data transfer for the transfer data A has terminated.

In the example shown in FIG. 6, it is not necessary to provide the all data transfer number holding unit 153 for holding the number of transfer of all data received from the DMA control unit 11 to the communication controller 15. Therefore, as compared with the example shown in FIG. 3, the peripheral circuits of the data transfer number counter 152 of the communication controller 15 can be reduced.

As described above, according to the present invention, a transfer destination device determines the termination of data transfer in the apparatus and method for performing DMA data transfer. Thus, the function of determining the termination is added in the transfer destination device, and the multiplicity of data transfer by the DMA in the DMA controller is enhanced, thereby improving the performance of the data transfer by the DMA almost without enlarging the scale of the circuit. As a result, an information processing device such as a computer with the performance of data transfer by the DMA largely enhanced can be provided.

What is claimed is:

1. An apparatus for performing DMA (Direct Memory Access) data transfer, comprising:
   a memory as a data transfer source;
   a transfer destination device as a data transfer destination;
   a DMA controller having a plurality of DMA engines each of which transfers data by DMA from the memory to the transfer destination device; and
   a DMA control unit being provided independently from the DMA controller and directing data transfer by the DMA to the plurality of DMA engines of the DMA controller,
   wherein the DMA control unit transmits, to the transfer destination device, a number of transfer of all data as determination information to determine the termination of the data transfer on data to be transferred, and the number of transfer of all data indicates a number of transfer required to transfer the data to be transferred, and
   wherein the transfer destination device comprises a data transfer number counter counting a number of data transfer completed for the data to be transferred, and an all data transfer number holding unit holding the number of transfer of all data, and determines the termination of the data transfer on the data to be transferred when a value of the data transfer number counter reaches the number of transfer of all data.

2. The apparatus according to claim 1,
   wherein the DMA control unit transmits the determination information to the transfer destination device for each of a plurality of data to be transferred, and
   wherein the transfer destination device determines the termination of the data transfer on each of the plurality of data to be transferred based on the determination information.

3. The apparatus according to claim 1, wherein the DMA control unit determines a division size of the data to be transferred such that the plurality of DMA engines can transfer the data, finalizes a number of transfer of all data as a number of transfer required to transfer the data to be transferred based on the determination result, and generates the determination information based on the finalization result.

4. The apparatus according to claim 1, wherein, after all data transfer number which is a transfer number required to transfer the data to be transferred is finalized, the DMA control unit transmits the determination information generated based on the finalization result to the transfer destination device.

5. The apparatus according to claim 1, wherein the counter MAX value is equal to a maximum value of a number of data transfer by DMA allowed in data transfer of the data to be transferred.

6. The apparatus according to claim 1,
   wherein the memory comprises a first memory storing data generated by a user, and a second memory storing data whose contents are predetermined, and
   wherein the second memory is positioned closer to the DMA control unit than the first memory.

7. The apparatus according to claim 1, further comprising:
   an information processing device comprising at least one expansion slot; and
   an expansion card loaded into the expansion slot,
   wherein the memory is provided for the information processing device or the expansion card, and the transfer destination device, the DMA controller, and the DMA control unit are provided for the expansion card.

8. The apparatus according to claim 7,
wherein the memory comprises a first memory storing data generated by a user, and a second memory storing data whose contents are predetermined, and
wherein the first memory is provided for the information processing device, and the second memory is provided for the expansion card.

9. The apparatus according to claim 7,
wherein the expansion card comprises a communication control card,
wherein the transfer destination device comprises a communication controller, and
wherein the information processing device is connected to a communication switch or another information processing device through the expansion card and communicates with the communication switch or another information processing device.

10. The apparatus according to claim 9, wherein the transfer destination device comprises a packet generation circuit generating a packet and performs packet communication with the communication switch or another information processing device.

11. The apparatus according to claim 10,
wherein the memory comprises a first memory storing data generated by a user and a second memory storing data whose contents are predetermined,
wherein the first memory is provided for the information processing device, and the second memory is provided for the expansion card, and
wherein the packet generation circuit generates the packet by forming a header of the packet with data transferred from the second memory, and forming a body of the packet with data transferred from the first memory.

12. A method for performing DMA data transfer implemented by an apparatus for performing DMA data transfer including a DMA controller having a plurality of DMA engines each of which transfers data from a memory to a transfer destination device and a DMA control unit being provided independently from the DMA controller for directing data transfer by DMA to the plurality of DMA engines of the DMA controller, comprising:
  determining, in the DMA control unit, a division size of data to be transferred such that the plurality of DMA engines can transfer the data, and directing data transfer by the DMA to the plurality of DMA engines of the DMA controller;
  dividing, in the plurality of DMA engines of the DMA controller, the data to be transferred, and transferring the data to the transfer device according to an instruction of the DMA control unit;
  transmitting, in the DMA control unit, a number of transfer of all data for determination of termination of the data transfer for the data to be transferred to the transfer destination device, the number of transfer of all data indicating a number of transfer required to transfer the data to be transferred; and
  terminating, in the transfer destination device, the data transfer for the data to be transferred when a value of the data transfer number counter reaches the number of transfer of all data;
  wherein the transfer destination device comprises a data transfer number counter counting a number of data transfer completed for the data to be transferred, and an all data transfer number holding unit holding the number of transfer of all data.

* * * * *